United States Patent
Green et al.

(10) Patent No.: US 9,440,733 B2
(45) Date of Patent: Sep. 13, 2016

(54) AIRCRAFT BRAKE ASSEMBLY

(71) Applicant: Messier-Dowty Limited, Gloucester, Gloucestershire (GB)

(72) Inventors: Chris Green, Churchdown (GB); Yann Simonneaux, Cheltenham (GB)

(73) Assignee: Messier-Dowty Limited (GB)

( * ) Notice: Subject to any disclaimer, the term of this patent is extended or adjusted under 35 U.S.C. 154(b) by 127 days.

(21) Appl. No.: 14/401,886

(22) PCT Filed: Apr. 15, 2013

(86) PCT No.: PCT/GB2013/050958
§ 371 (c)(1),
(2) Date: Nov. 18, 2014

(87) PCT Pub. No.: WO2013/175167
PCT Pub. Date: Nov. 28, 2013

(65) Prior Publication Data
US 2015/0136902 A1    May 21, 2015

(30) Foreign Application Priority Data
May 21, 2012    (GB) .................................. 1208923.1

(51) Int. Cl.
*B64C 25/36*     (2006.01)
*B64C 25/42*     (2006.01)
*B64C 25/62*     (2006.01)
*B64C 25/34*     (2006.01)
(Continued)

(52) U.S. Cl.
CPC ............... *B64C 25/36* (2013.01); *B64C 25/34* (2013.01); *B64C 25/42* (2013.01); *B64C 25/62* (2013.01)

(58) Field of Classification Search
CPC ....... B64C 25/36; B64C 25/34; B64C 25/42; B64C 25/62; B64C 25/32; B64C 25/04; B64C 25/14; B64F 2700/6238; F16D 63/00; B60T 1/14; B60T 1/02; B60B 15/00
USPC ....... 301/40.2, 40.6; 188/24.12, 1.12, 4 R, 5, 188/32; 180/15
See application file for complete search history.

(56) References Cited

U.S. PATENT DOCUMENTS 2,273,663 A * 2/1942 Robert .................... B60B 11/02
                                                        180/15
4,296,897 A   10/1981 Thompson
(Continued)

FOREIGN PATENT DOCUMENTS

GB         656203           8/1951
GB         656203 A  *      8/1951    ............ B60T 8/3235

OTHER PUBLICATIONS

Written Opinion of the International Searching Authority and International Search Report for International Application No. PCT/GB2013/050958 mailed Aug. 6, 2013.
(Continued)

*Primary Examiner* — Tien Dinh
*Assistant Examiner* — Vicente Rodriguez
(74) *Attorney, Agent, or Firm* — RatnerPrestia

(57) ABSTRACT

An aircraft brake assembly comprising a support leg, a main wheel rotatably mounted on the support leg, a brake comprising a first sub-assembly fixed to the main wheel and a second sub-assembly moveably mounted on the support leg and a ground reaction wheel coupled to the second sub-assembly, wherein on application of the brake, the first sub-assembly engages with the second sub-assembly to exert a braking force on the second sub-assembly; and wherein the ground reaction wheel is arranged to transfer the braking force from the second sub-assembly to the ground.

13 Claims, 5 Drawing Sheets

(56) References Cited

U.S. PATENT DOCUMENTS 5,746,394 A     5/1998   Gunnoe
6,698,689 B1 *   3/2004   Dazet .................... B64C 25/32
                                                                     244/102 R

OTHER PUBLICATIONS

Great Britain Search Report mailed Aug. 3, 2012 in Great Britain Application No. GB1208923.1.

* cited by examiner

AIRCRAFT BRAKE ASSEMBLY

This application is a U.S. National Phase application of PCT International Application No. PCT/GB2013/050958, filed Apr. 15, 2013, which claims the benefit of GB 1208923.1, filed May 21, 2012, both of which are incorporated herein by reference.

BACKGROUND OF THE INVENTION

In a typical aircraft landing gear, multidisc brake assemblies are installed on aircraft wheels to enable braking after an aircraft has touched down on a runway. Typically, these brake assemblies comprise a set of disc brakes permanently fixed to a wheel and a set of brake pads fixed to the leg or axle of the landing gear upon which the wheel is mounted. On application of the brakes, the brake pads push against the disc brakes creating a frictional force which acts against the rotation of the wheels, causing the aircraft to slow down.

In these configurations, rotation of the brake assembly, attached to the landing gear leg or axle is prevented by way of a brake rod or a brake flange (a series of bolts passing through a mount) integral to the landing gear leg. Accordingly, the torque produced when the brake is applied is transferred from the brake to the brake rod and/or bolts and reacted through the landing gear. This causes substantial stress and strain on landing gear components. Accordingly, aircraft landing gear are reinforced to withstand the significant torque created by application of the brakes, resulting in added weight and complexity. The stresses concerned also reduce the lifetime of the landing gear, in particular those parts active in reacting the braking forces.

SUMMARY OF THE INVENTION

According to a first aspect of the invention there is provided an aircraft brake assembly comprising a support leg, a main wheel rotatably mounted on the support leg, a brake comprising a first sub-assembly fixed to the main wheel and a second sub-assembly moveably mounted on the support leg and a ground reaction wheel coupled to the second sub-assembly, wherein on application of the brake, the first sub-assembly engages with the second sub-assembly to exert a braking force on the second sub-assembly; and wherein the ground reaction wheel is arranged to transfer the braking force from the second sub-assembly to the ground.

Thus, braking force is reacted through the ground via the ground reaction wheel. Accordingly, reinforcements usually required for known configurations (pins, bolts, flanges or rods etc) are not required. The landing gear can therefore be made lighter and less complex. Furthermore, since rotation of the second sub-assembly no longer needs to be inhibited, bolts can be disposed of altogether, enabling easier servicing, removal and replacement of the second sub-assembly from the landing gear. Moreover, since fewer fixings are required to attach the second sub-assembly to the landing gear, structural components may be made simpler leading to a reduction in weight, and a reduction in cost due to the use of less raw materials and a simplified manufacturing process.

The ground reaction wheel may be coupled to the second sub-assembly via a brake arm wherein the ground reaction wheel is rotatably mounted on the brake arm. Alternatively, the ground reaction wheel may be coupled directly to the second sub-assembly.

The brake arm may be rigidly fixed onto the second sub-assembly. Thus, the brake arm may be retrofitted to existing landing gear brake assemblies known in the art. Alternatively, the brake arm may be integrated as part of the second sub-assembly.

The movement of the second sub-assembly relative to the support leg may be inhibited beyond a threshold of travel, thus preventing undesired movement of the second sub-assembly when the aircraft is on the ground during braking, and when the aircraft is in the air, whether or not the brakes are applied.

The movement of the second sub-assembly relative to the support leg may be inhibited using one or more dampers. Thus, vibrations and oscillations in the second sub-assembly may be reduced or prevented.

The rotation of the second sub-assembly relative to the support leg may be prevented beyond a threshold of travel using one or more stops.

The second sub-assembly may be rotatably biased into a position in which the ground reaction wheel is prevented from touching down on the ground before the main wheel during landing. Thus, the main wheel can touch down on the ground before the ground reaction wheel, preventing undue stress and strain on the ground reaction wheel, the brake arm and other elements of the landing gear.

The aircraft brake assembly may further comprise a biasing device arranged to bias the brake reaction wheel away from contact with the ground or into contact with the ground. The biasing device may include one or more of a spring or an actuator.

The aircraft brake assembly may further comprise one or more additional main wheels and one or more associated additional brakes. In which case, one or more brake reaction wheels may be disposed between two of the main wheels.

According to a second aspect of the invention there is provided an aircraft landing gear including the aircraft braking assembly described above.

BRIEF DESCRIPTION OF THE DRAWINGS

Embodiments of the invention will now be described by way of non-limiting example only, with reference to the accompanying drawings, of which.

DETAILED DESCRIPTION OF EMBODIMENTS

Figure 1:
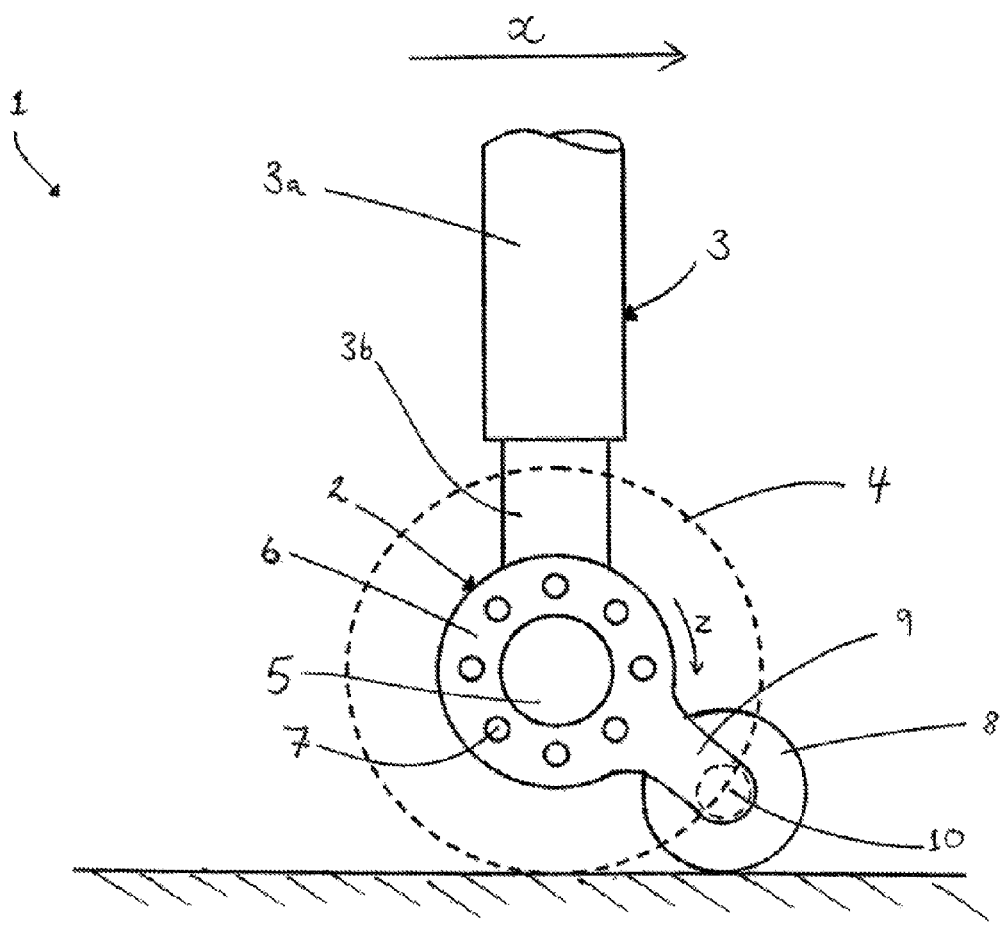
FIG. 1 is a side view of an aircraft landing gear comprising a brake assembly in accordance with an embodiment of the present invention including a ground reaction wheel, with the aircraft landing gear on the ground.

FIG. 1 shows an aircraft landing gear 1 including a brake assembly 2 according to an embodiment of the present invention, the aircraft landing gear 1 being on the ground. The aircraft landing gear 1 comprises a telescopic support leg 3 including upper and lower portions 3a, 3b. Embodiments described herein comprises a telescopic support leg. However, the skilled person will appreciate that the present invention is equally applicable to aircraft landing gear comprising fixed landing gear legs. In the embodiment illustrated, the landing gear is a main landing gear having a single pair of main wheels 4 located at either end of an axle 5, which may form part of the lower portion 3b of the telescopic support leg 3. The skilled person will appreciate that this design could be implemented on a main landing gear with a bogie beam having two or more pairs of tyres, with the mechanism described herein incorporated into one or more of the wheels and associated brakes. The aircraft landing gear 1 is preferably coupled to the aircraft structure (not shown). Each main wheel 4 has associated with it a brake assembly 2. The brake assembly 2 comprises a first sub-assembly (not shown) fixed to the wheel in accordance with any braking system known in the art and a second sub-assembly 6 mounted on the axle 5 of the landing gear 1 and rotatable about a longitudinal axis of the axle 5. As is true for many known brake assemblies, the first sub-assembly may include a plurality of parallel wheel discs, each separated from its neighbour by a small displacement, and the second sub-assembly 6 may comprise a plurality of brake discs interposed between the wheel discs of the first sub-assembly. Alternatively, the first sub-assembly may comprise the brake discs and the second sub-assembly the wheel discs. The second sub-assembly 6 of the brake assembly 2 further comprises a plurality of pistons 7 operable to push the brake discs into contact with the wheel discs.

When no braking is applied, the wheel disks of the first sub-assembly are free to rotate between the brake discs allowing the wheel 4 to spin unhindered. On application of the brake, the pistons 7 press the wheel and brake discs together, creating friction between the brake discs and the wheel discs which consequently induces a corresponding braking force.

In prior art braking systems, the braking force created by the second sub-assembly 6 of the brake assembly 2 is reacted either through a series of bolts fixing the second sub-assembly 6 to the axle 5 or through a brake pin coupled to the second sub-assembly 6 and linked to a brake rod and/or directly to the landing gear leg 1. On application of the brakes, these bolts or rods and pins prevent rotation of the second sub-assembly 6 thereby allowing braking force to reduce the speed of rotation of the wheels 4. Accordingly, landing gear elements need to be reinforced to withstand the significant torque created by application of the brakes at high speed. Reinforcements result in added weight and complexity of the aircraft landing gear 1.

In accordance with the present invention, unlike the known braking system described above, the braking force created by application of the brake discs in the second sub-assembly 6 is not reacted through pins, rods or bolts arranged to prevent rotation of the second sub-assembly 6.

Instead, referring to FIG. 1, a ground reaction wheel 7 is coupled to the second sub-assembly 6 of the brake assembly 2. The ground reaction wheel 7 is arranged to limit rotation of the second sub-assembly with respect to the landing gear leg 3. The ground reaction wheel 7 may be coupled to the second sub-assembly 6 via a brake arm 9 consisting of a rod or bar projecting outward from the second sub-assembly, preferably in a direction substantially parallel to the direction of travel of the landing gear 1. The brake arm 9 may be a separate element rigidly fixed to the second sub-assembly 6, in such cases the brake arm 9 may be retrofitted to existing aircraft brake assemblies. Alternatively, the brake arm 9 may be manufactured as an integral part of the second sub-assembly 6. The ground reaction wheel 8 is rotatably mounted on an axle 10 of the brake arm 9, located on the outward end of the brake arm 9. As shown in FIG. 1, the direction of travel of the aircraft landing gear 1 is denoted by arrow x, moving from left to right across the page. The brake arm 9 preferably protrudes from the second sub-assembly 6 in the direction of motion of the aircraft. Thus, the ground reaction wheel 7 is positioned in front of the main wheel 4. As an alternative to the brake arm 9, the ground reaction wheel may be mounted directly onto an axle located on the second sub-assembly 6.

On application of the brakes, since the second sub-assembly 6 of the brake assembly 2 is not rigidly constrained but rotatably mounted on the axle 5, rotation of the wheel, and therefore the first sub-assembly, creates a torque (denoted by arrow z) on the second sub-assembly 6 that rotates the second sub-assembly 6, thereby bringing the ground reaction wheel 8 into contact with the ground. The reactive force of the ground on the ground reaction wheel 8 then prevents any further rotation of the second sub-assembly 6. Accordingly, instead of the braking force being reacted through the landing gear 1, the braking force is transferred to the ground via the ground reaction wheel 8.

This configuration provides several advantages over prior art brakes. Almost all of the braking force is reacted through the ground via the ground reaction wheel 8. Accordingly, reinforcements usually required for known configurations (pins, bolts, flanges or rods etc) are not required. The landing gear structure can therefore be made lighter and less complex. Furthermore, since rotation of the second brake sub assembly 6 no longer needs to be inhibited, brake pins, rods, flanges and bolts can be disposed of altogether, enabling easier servicing, removal and replacement of the second sub-assembly 6 from the landing gear. Moreover, since fewer fixings are required to attach the second sub-assembly 6 to the landing gear, the axle 5 may be made simpler leading to a reduction in weight, and a reduction in cost due to the use of less raw materials and a simplified manufacturing process.

It will be evident to a person skilled in the art that a completely freely rotating second sub-assembly 6 may present problems with regards to damage, maintenance and safety of the aircraft landing gear 1. Rotation of the second sub-assembly 6 is therefore preferably inhibited beyond a set threshold position to prevent over rotation when the brake is applied, and undesired rotation when the aircraft landing gear 1 is airborne, whether or not the brake is applied. Movement of the second sub-assembly 6 may also be damped to prevent undue resonance using one or more dampers, springs, or stops attached to the axle or telescopic leg 3 of the aircraft landing gear 1.

Figure 2:
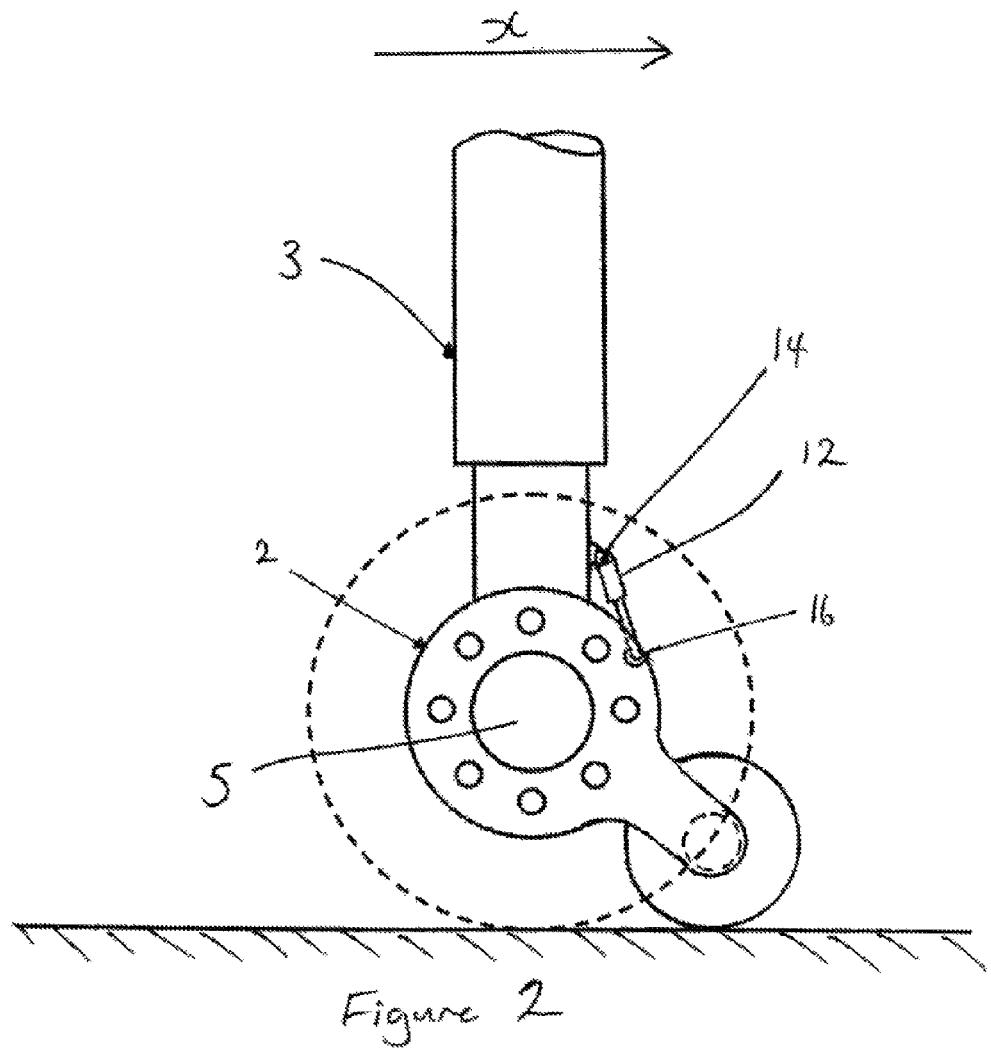
FIG. 2 is a side view of the aircraft landing gear of FIG. 1 further comprising a damper and/or actuator to inhibit and/or control rotation of portions of the brake assembly.

FIG. 2 illustrates one example of such an embodiment, where like parts are given like numbers, wherein rotation of the second sub-assembly 2 is suppressed using a damper 12 coupled between a first fixing 14 located on the telescopic support leg 3 and a second fixing 16 located on the second sub-assembly 2. The damper 12 may be a hydraulic or mechanical damper 12. Damping may also be achieved using a spring instead or in addition to the damper. The damper 12 or spring may be positioned anywhere between a fixed point on the axle 5 or telescopic support leg and the second sub-assembly 6 whilst still acting to inhibit rotation of the second sub-assembly 6. Alternatively, vibration suppression could be integrated into the axle 5, for example using a spring or damper positioned within the cross section of the axle 5.

Figure 3:
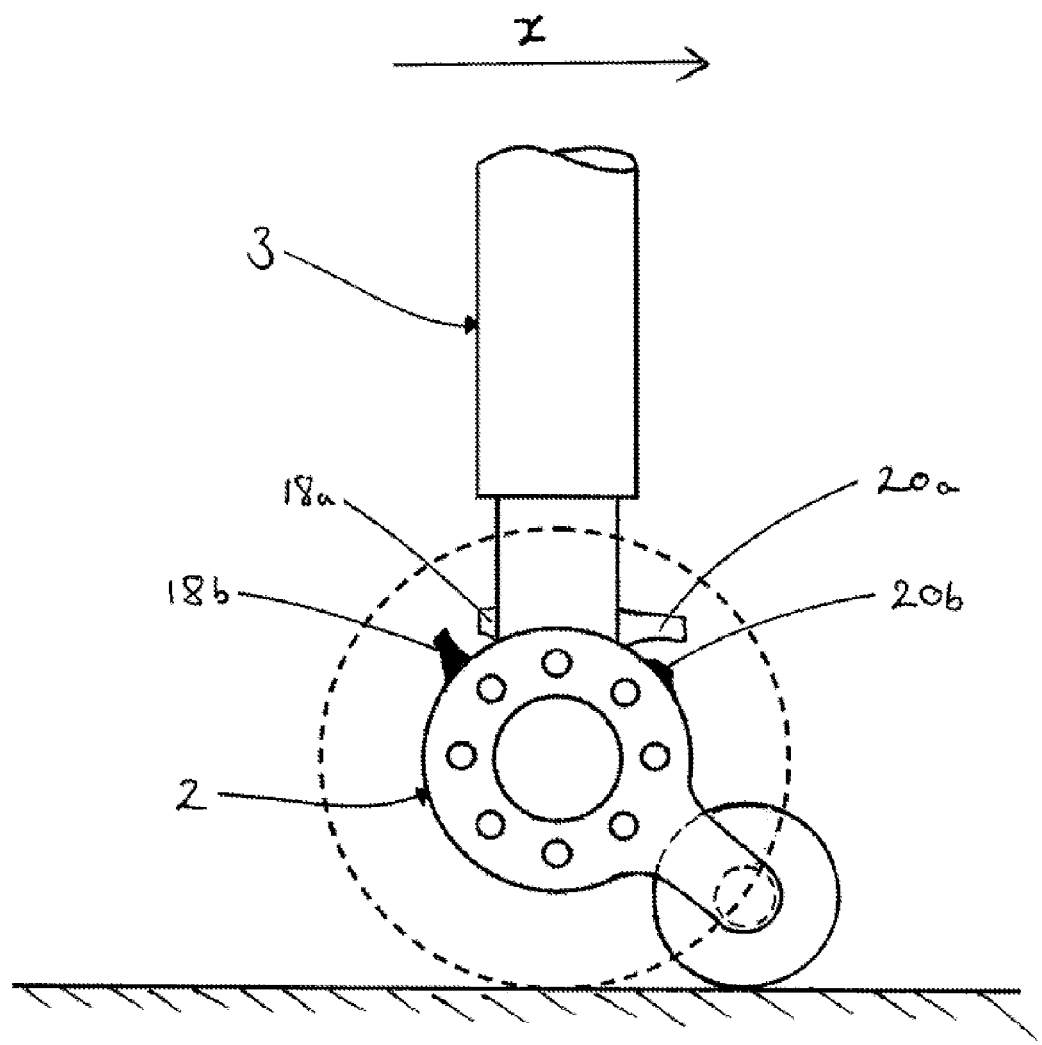
FIG. 3 is a side view of the aircraft landing gear of FIG. 1 further comprising stops to inhibit rotation of portions of the brake assembly beyond a threshold position.

Mechanical hard stops may be used to prevent over rotation of the second sub-assembly 6. FIG. 3 illustrates an example of such an embodiment in which a number of mechanical stops are provided. A first stop 18*a* may be coupled or integrated into the back edge of the telescopic landing leg 3 and positioned so as to interact with the second stop 18*b* positioned, for example, on the radial edge of the second sub-assembly 6 to prevent clockwise movement of the second sub-assembly 2 beyond a threshold position. Alternatively, the first stop 18*a* may not be used, the second stop 18*b* instead interacting directly with the landing gear 1 to prevent over rotation of the second sub-assembly 2. Conversely, a third stop 20*a* may be coupled or integrated into the front edge of the telescopic landing leg 3 and positioned so as to interact with a fourth stop 20*b*, positioned, for example, on the radial edge of the second sub-assembly 6 to prevent anti-clockwise movement of the second sub-assembly 2 beyond a threshold position. Alternatively, the third stop 20*a* may not be used, the fourth stop 20*b* instead interacting directly with the landing gear 1 to prevent over rotation of the second sub-assembly 2. It will be apparent to the skilled person that other configurations of stops to prevent over rotation of the second sub-assembly 6 exist which may achieve equivalent results.

Figure 4:
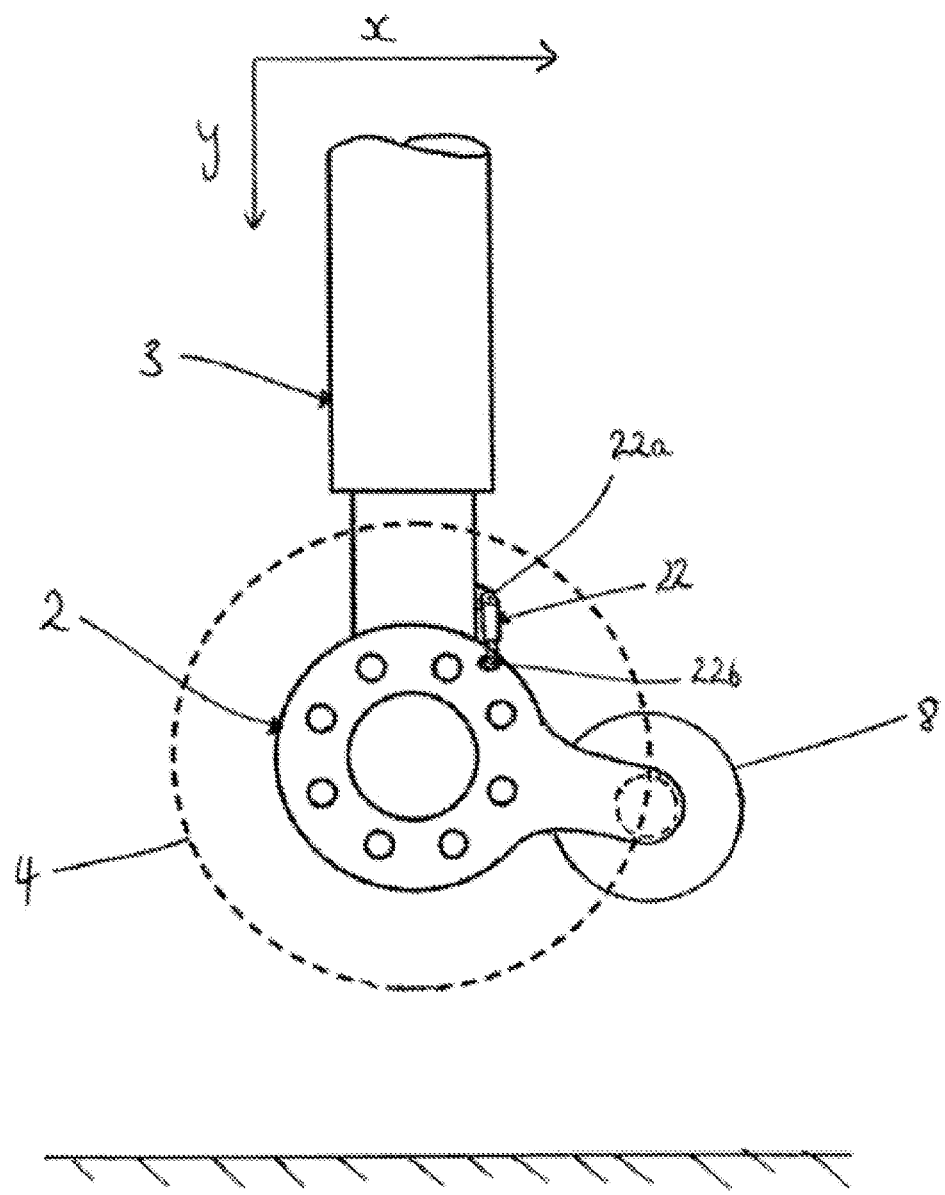
FIG. 4 is a side view of the aircraft landing gear of FIG. 2 with the ground reaction wheel biased out of contact with the ground.

In addition to inhibiting movement using dampers and/or stops as described above, one or more actuators or springs may be incorporated into the brake assembly 2 to bias the second sub-assembly 6 into set positions during taxiing and take-off of the aircraft and stowage of the aircraft landing gear 1. An illustrative example is shown in FIG. 4. FIG. 4 shows such an embodiment with an actuator 22 coupled between a first fixing 22*a* on the telescopic support leg 3 and a second fixing 22*b* on the second sub-assembly 6. Alternatively or additionally, a spring may be used to bias the second sub-assembly 6, the spring disposed in a similar position to that of the actuator 22. Methods described hereon in relation to the actuator 22 may, if applicable, be performed using a spring in place or in addition to the actuator 22.

During take-off and just before landing, the brakes of the aircraft may not be applied, since at take-off the aircraft is accelerating, and just before landing the wheels should be free to rotate to allow the wheels to commence to rotate at the point of landing. Accordingly during take-off and taxiing, if no braking is required, the second sub-assembly 2 is preferably rotated so as to bring the ground reaction wheel 8 out of contact with the ground to reduce wear and friction. A similar configuration may also be used just prior to landing, preferably in order to prevent the ground reaction wheel 8 touching down before the main wheel(s) 4. Alternatively, the second sub-assembly 6 may be biased so as to bring the ground reaction wheel 8 into contact with the ground before the main wheel 4.

The actuator 22 and/or a spring may provide damping in addition or in place of the damper 12 described with reference to FIG. 2. The skilled person will appreciate that damping and/or biasing may be provided by any damping or biasing method known in the art.

During stowage of the aircraft landing gear 1 in the fuselage of an aircraft, the actuator 22 may be configured to move the ground reaction wheel 8 into a suitable position for stowage. The optimum position for stowage may depend on the aircraft upon which the aircraft landing gear is mounted, as will be appreciated by a person skilled in the art.

The second sub-assembly 6 may be biased using a passive device, for example a spring biased into a naturally contracted or extended state, whilst exhibiting a degree of freedom in movement, so that on application of the brakes it may extend elastically or compress under force, for example to allow the ground reaction wheel 8 to contact the ground during braking. Alternatively or additionally, the second sub-assembly may be biased using an active device, for example the actuator 22, with the ability to be mechanically or electrically actuated to rotate the second sub-assembly 6 about the longitudinal axis of the axle 5.

Once the wheel(s) 4 have touched down on the ground and the brakes have been applied, a torque is transferred from the first sub-assembly to the second sub-assembly 6 via the associated wheel and brake discs. The torque applied to the second sub-assembly 6 will then cause it to rotate, bringing the ground reaction wheel 8 down and into contact with the ground and overcoming any opposing force associated with the actuator 22 or spring.

Figure 5:
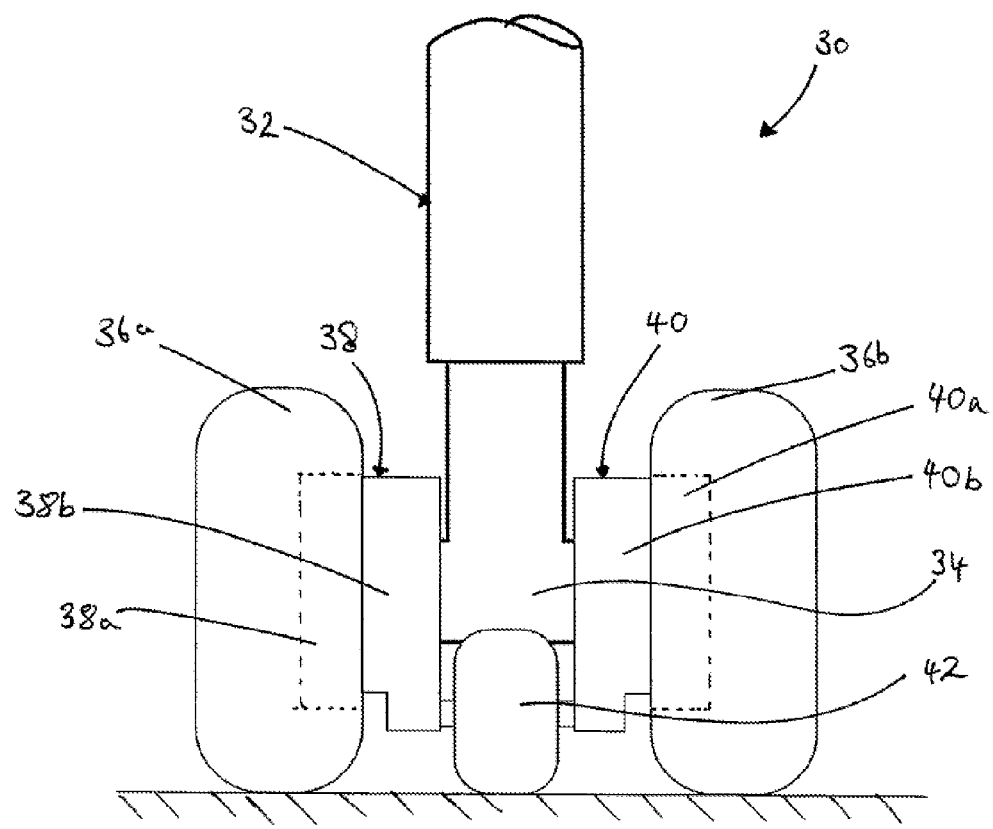
FIG. 5 is a front view of an aircraft landing gear comprising a brake assembly in accordance with a further embodiment of the present invention.

Embodiments described above each include a brake comprising a sub-assembly which is rotatably mounted on an axle 5 and coupled to a ground reaction wheel 8. However, in other embodiments, a single ground reaction wheel may be shared amongst multiple main wheels. An example of such an embodiment is illustrated in FIG. 5, which shows a front view of aircraft landing gear 30 in accordance with an embodiment of the invention. The aircraft landing gear 30 comprises a telescopic support leg 32, and an axle 34 coupled to or integrated into the telescopic support leg 30. A plurality of wheels 36*a*, 36*b* are rotatably mounted on the axle 34. Each wheel 36*a*, 36*b* has associated with it a brake 38, 40 equivalent to the brake assembly 2 described with reference to FIGS. 1 to 4, comprising a first sub-assembly 38*a*, 40*a* (shown as broken lines) and a second sub-assembly 38*b*, 40*b* which is equivalent to the second sub-assembly 6 also shown in FIGS. 1 to 4.

In the embodiment shown, the second brake sub-assemblies 38*b*, 40*b* are both coupled to a single ground reaction wheel 42, preferably positioned between the wheels 36*a*, 36*b*. Accordingly, when the brakes 38, 40 are applied, torque is transferred through the second brake sub-assemblies 38*b*, 40*b* to the single ground reaction wheel 42, preferably centred in respect of the landing gear centreline, thereby transferring reacting force through a balanced centreline.

The invention claimed is:

1. An aircraft brake assembly comprising:
   a support leg;
   a main wheel rotatably mounted on the support leg;
   a brake comprising a first sub-assembly fixed to the main wheel and a second sub-assembly moveably mounted on the support leg; and
   a ground reaction wheel coupled to the second sub-assembly;
   wherein on application of the brake, the first sub-assembly engages with the second sub-assembly to exert a braking force on the second sub-assembly; and wherein the ground reaction wheel is arranged to transfer the braking force from the second sub-assembly to the ground.

2. An aircraft brake assembly according to claim 1 wherein the ground reaction wheel is coupled to the second sub-assembly via a brake arm and wherein the ground reaction wheel is rotatably mounted on the brake arm.

3. An aircraft brake assembly according to claim 2 wherein the brake arm forms part of the second sub-assembly.

4. An aircraft brake assembly according to claim 2 wherein the brake arm is rigidly fixed to the second sub-assembly.

5. An aircraft brake assembly according to claim 1 wherein the ground reaction wheel is mounted directly onto the second sub-assembly.

6. An aircraft brake assembly according to claim 1 wherein the movement of the second sub-assembly relative to the support leg is inhibited beyond a threshold of travel.

7. An aircraft brake assembly according to claim 6 wherein the movement of the second sub-assembly relative to the support leg is inhibited by one or more dampers.

8. An aircraft brake assembly according to claim 6 wherein the rotation of the second sub-assembly relative to the support leg is prevented beyond a threshold or travel by one or more stops.

9. An aircraft brake assembly according to claim 1 wherein the second sub-assembly is biased into a position in which the ground reaction wheel is prevented from touching down on the ground before the main wheel during landing.

10. An aircraft brake assembly according to claim 1 further comprising a biasing device arranged to bias the ground reaction wheel away from contact with the ground or into contact with the ground.

11. An aircraft brake assembly according to claim 10 wherein the biasing device includes one or more of a spring or an actuator.

12. An aircraft brake assembly according to claim 1 further comprising one or more additional main wheels and one or more associated additional brakes.

13. An aircraft brake assembly according to claim 12 wherein the ground reaction wheel is disposed between two of the main wheels.

\* \* \* \* \*